United States Patent [19]
Rast

[11] Patent Number: 6,137,415
[45] Date of Patent: Oct. 24, 2000

[54] AUDIO SIGNAL FOR SPRING-LOADED RODENT TRAPS

[75] Inventor: Rodger Hugo Rast, Gold River, Calif.

[73] Assignee: Rastar Corporation, Gold River, Calif.

[21] Appl. No.: 09/039,288

[22] Filed: Mar. 12, 1998

[51] Int. Cl.⁷ .................................................. G08B 23/00
[52] U.S. Cl. ........................... 340/573.2; 340/384.1; 340/384.6; 340/686.1; 340/692; 43/96; 43/98; 43/81
[58] Field of Search ............................ 340/573.2, 386.1, 340/384.2, 384.3, 384.5, 384.6, 384.7, 686.1, 692, 691.1; 43/96, 98, 81

[56] References Cited

U.S. PATENT DOCUMENTS

| | | | |
|---|---|---|---|
| 1,290,697 | 1/1919 | Banash | 43/8.1 |
| 2,554,728 | 5/1951 | Barber | 43/8.1 |
| 4,517,557 | 5/1985 | Agron et al. | 43/8.2 |
| 4,616,113 | 10/1986 | Jank et al. | 340/568.1 |
| 5,107,619 | 4/1992 | Zapata et al. | 43/8.1 |
| 5,154,017 | 10/1992 | Disalvo | 43/8.1 |
| 5,184,416 | 2/1993 | Brewer | 43/8.1 |
| 5,477,635 | 12/1995 | Orsano | 43/8.1 |
| 5,642,095 | 6/1997 | Cook | 340/568.1 |
| 5,706,601 | 1/1998 | Dail | 43/8.1 |
| 5,892,444 | 4/1999 | Wittmer et al. | 340/568.1 |

*Primary Examiner*—Nina Tong
*Attorney, Agent, or Firm*—Rodger H. Rast

[57] ABSTRACT

An audio signaling device designed for mounting on spring-loaded rodent traps. The device audibly signals when its associated trap has been triggered. Upon reliable detection of triggering, an audio signal is emitted as an initial audio tone sequence followed by an audio beacon mode; wherein operation alternates between long periods of very low-power silent operation and short audio tone sequences. The device may be reliably attached to traps of various sizes and designs, while the power provided by the battery powers it for extended periods. Additionally the signaling device can be programmed to generate unique audio tunes while being easily manufactured from low-cost parts.

20 Claims, 7 Drawing Sheets

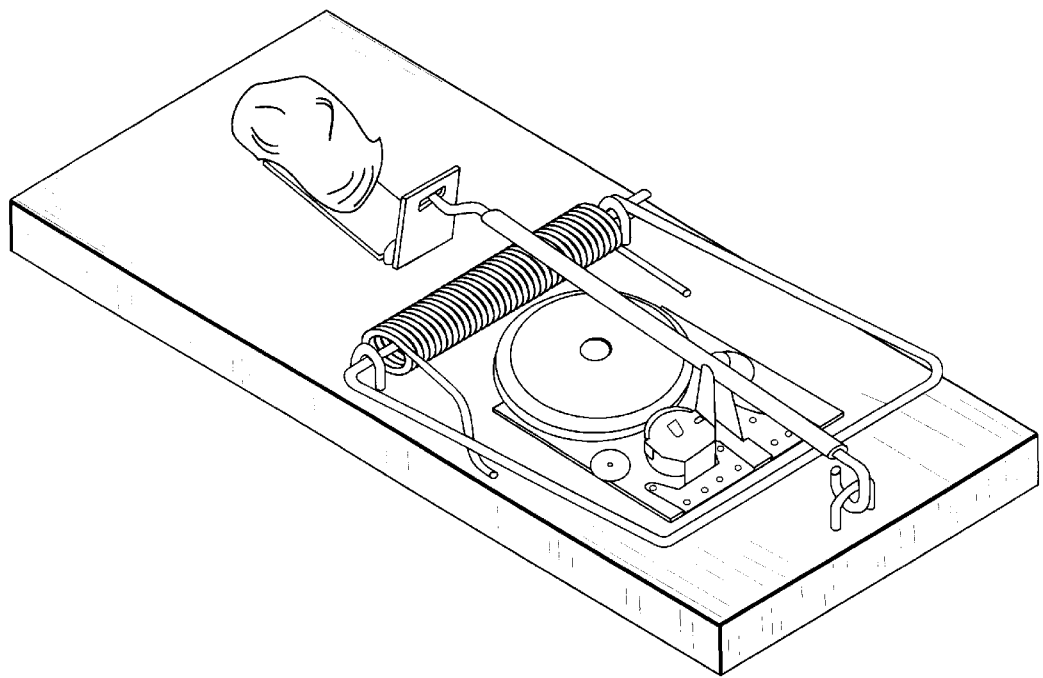
FIG. 1-A
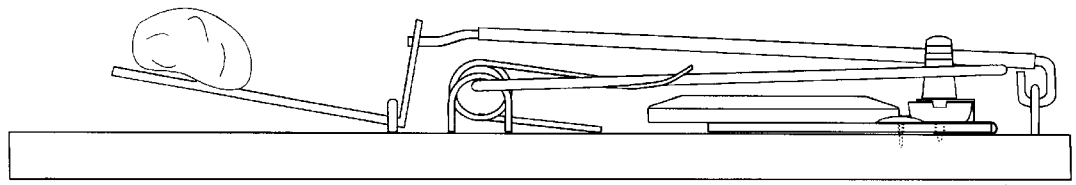
FIG. 1-B

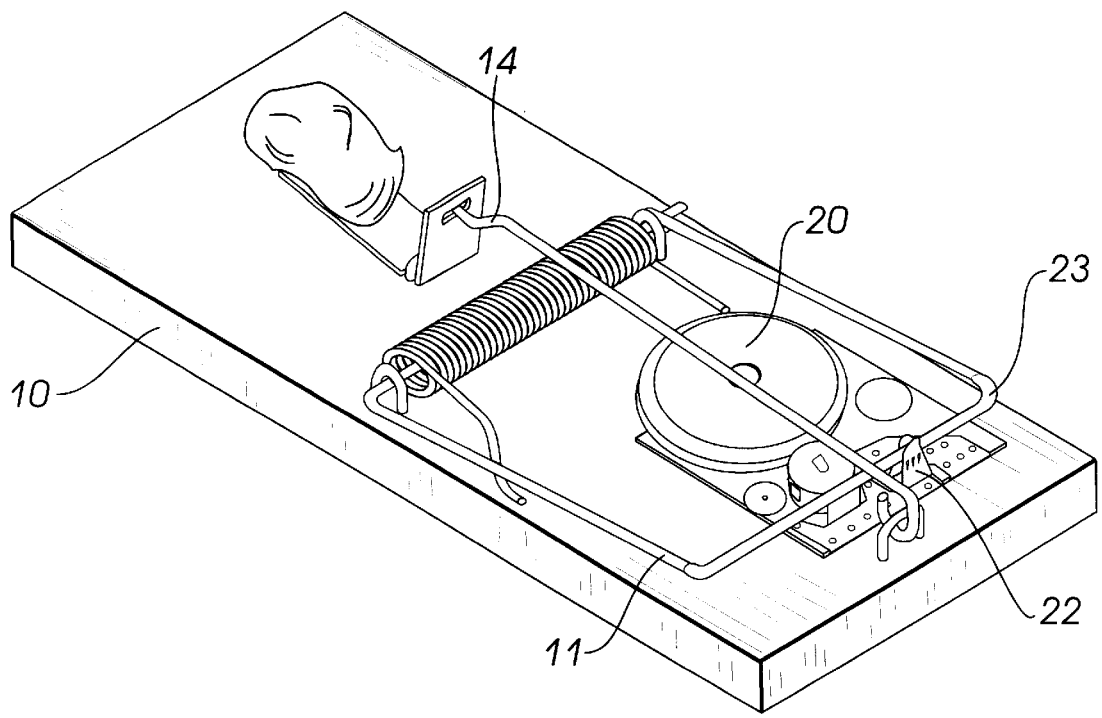
FIG. 5
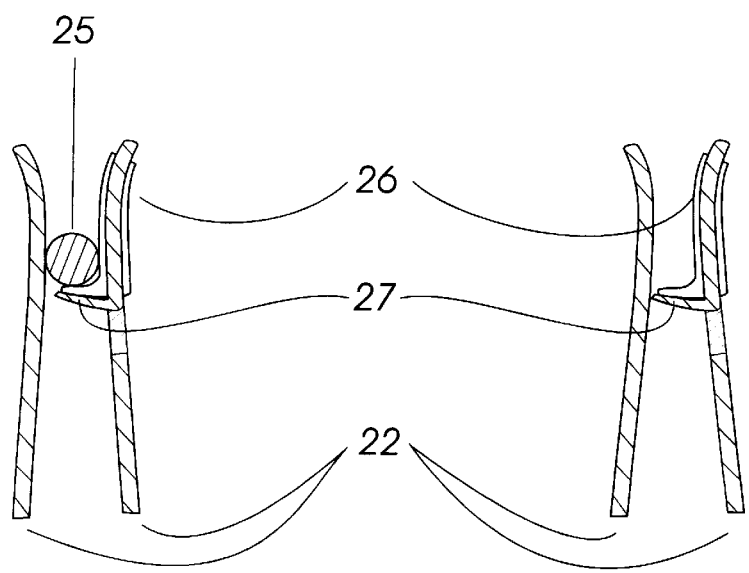
FIG. 6-A  FIG. 6-B

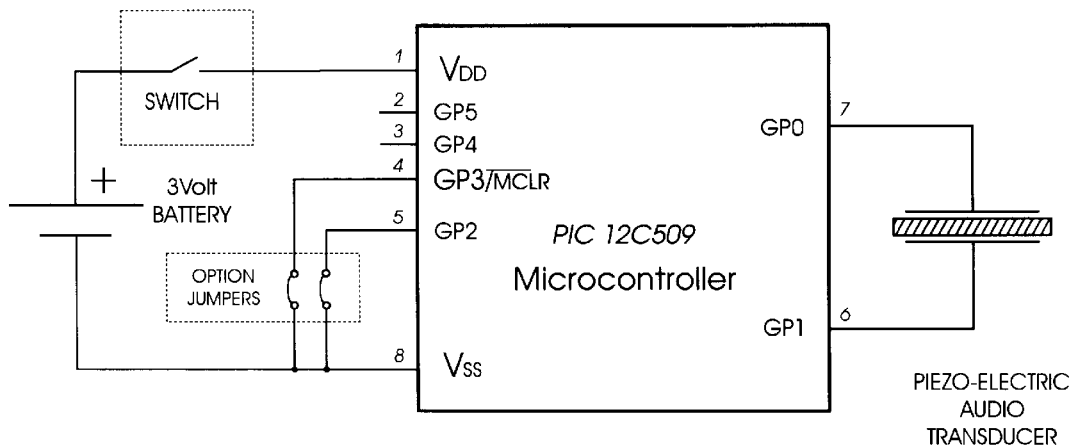
FIG. 7-A
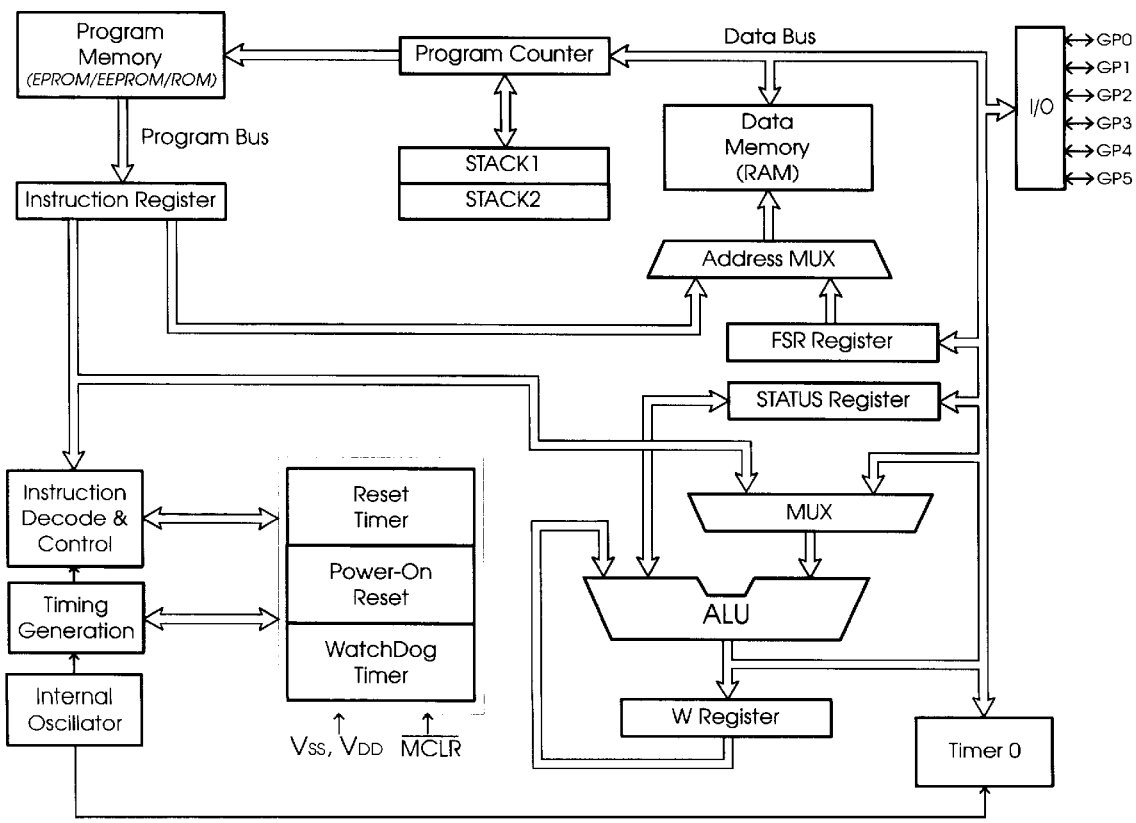
FIG. 7-B

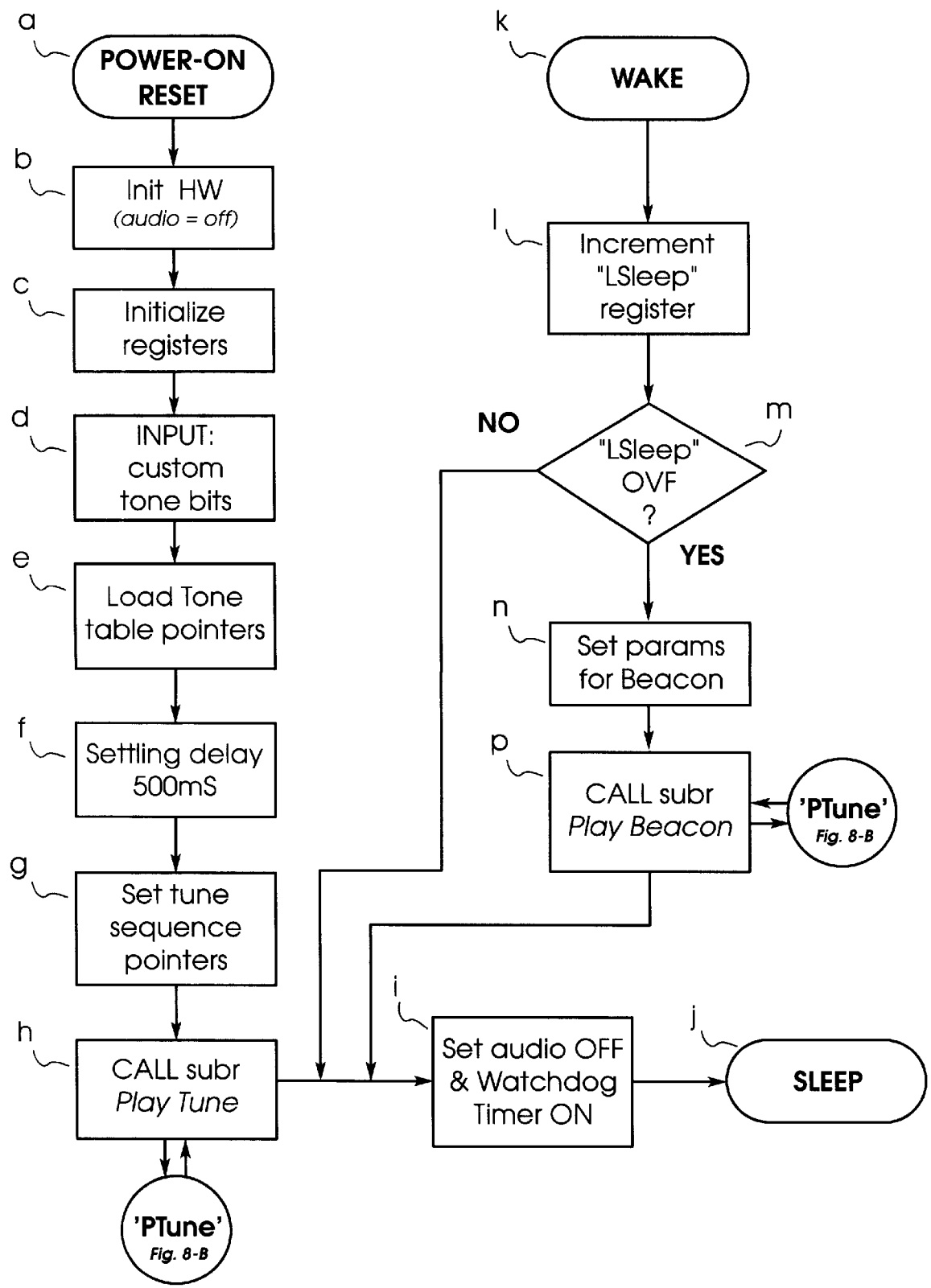
FIG. 8-A

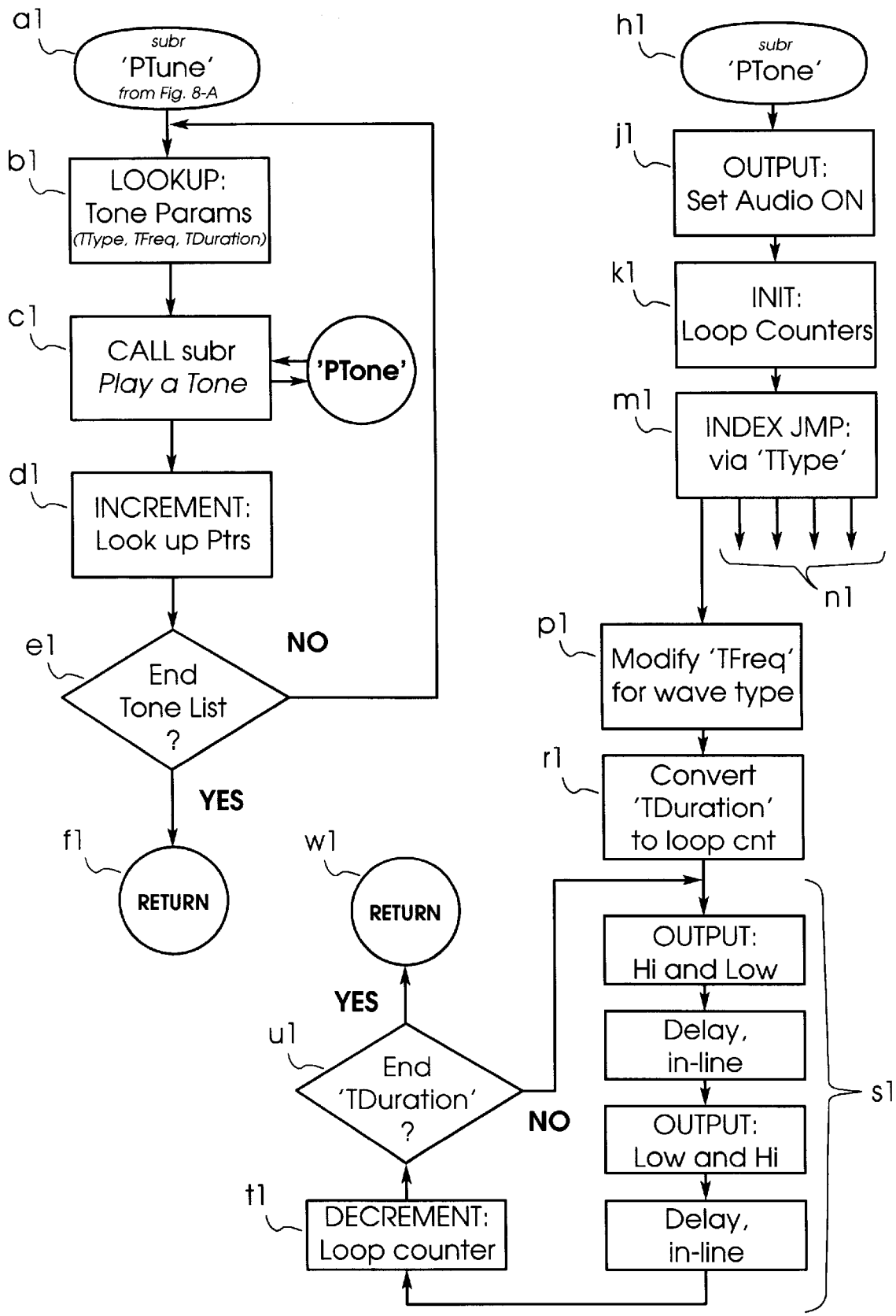
FIG. 8-B

AUDIO SIGNAL FOR SPRING-LOADED RODENT TRAPS

BACKGROUND

1. Field of Invention

The present invention relates to rodent control devices; specifically an audio signal to be used on rodent traps of a type wherein a rodent attempting to feed on a bait triggers a coiled spring loaded trapping jaw.

2. Description of Prior Art

Rodent traps with a spring actuated trapping jaw have long been a simple and effective means of rodent abatement. In practice these traps are set, placed, and then checked on a periodic basis, usually daily, to assure that a trapped rodent does not escape, a deceased rodent is not fed upon, a deceased rodent does not create odors, and finally to free up the trap and reset it allowing other rodents to then be trapped. As rodents tend to hide in small dark places within attics, corners and outbuildings: traps placed in these areas are difficult to access during periodic trap checks. If it were known when a trap had been triggered; periodic trap checks would not be required. Therefore it has long been desirable to provide a signal that activates when a trap has been triggered.

In U.S. Pat. No. 1,290,697 of 1919 the animal trap of Banash contains a bell signaling means. A one time signal such as this requires the trapper to be nearby, while the animal to be trapped must not be scared off by a tinkling bell while investigating the trap.

Later in Barber's U.S. Pat. No. 2,554,728 in 1951, an electrical switch is attached to each animal trap so that animal trappers have the capability of remotely checking trap condition.

Agron's U.S. Pat. No. 4,517,557 in 1985 is directed toward spring loaded rodent traps and employs a frame with integral switch in which a rodent trap is inserted. An unspecified remote indicator means then senses a change in state of the switch when the inserted rodent trap separates from the surrounding frame. This sensing arrangement has numerous limitations and drawbacks: (1) The inserted trap must fit precisely with the sense-frame to allow the switch to operate correctly. (2) Due to the numerous variables and interrelations between trap, frame and rodent; the inserted trap does not necessarily jump out of the frame device upon the trap being triggered. (3) The use of an external signaling means requires one or more traps to be wired to the signaling device; which is time-consuming, unsightly, a tripping hazard and an added expense.

In Disalvo's U.S. Pat. No. 5,154,017 of Oct. 13, 1992 the rodent trap itself is used as a base to fasten and connect the various parts for this signaling mechanism and the metal wire jaw member is made part of the circuit. A DC buzzer is connected to a 9 Volt battery that is in series with a switch formed by the jaw member itself and a conductive spring mounted on the trigger side of the trap. Several drawbacks to this device limit its commercial application: (1) The parts comprising the signaling means in the preferred embodiment are far too large to be employed with small traps, such as mouse traps: note the size of a 9 Volt battery. (2) The switch mechanism used requires conduction through disparate trap member sections whose electrical contact is problematic; considering the conditions under which the trap is required to operate. (3) The spring-loaded jaw member, or killing member, of the trap is required to make contact with a spring on the side of the trap whereby the rodent is to be trapped; if any portion of the rodent gets pinched between the jaw member and spring contact, or if the rodent is trapped with a large portion of its body near the center of the trap, the jaw member will not properly contact the spring contact. (4) The spring contact is located near the pivot point of the cross member around which the jaw member rotates such that when the jaw member is triggered the spring contact mechanism forms a fulcrum. Upon triggering; the jaw member sharply strikes the spring mechanism thus imposing a vertical load on the wire staple or means of holding the cross member, or pivoting section of the jaw, to the base. The vertical force is greatly pronounced upon triggering when no rodent is trapped, and leads to premature trap failure. (5) Separate elements of spring contact, buzzer and battery are mounted permanently to the trap with members affixed to both the trapping means and the base assembly. This is a lengthy and costly assembly process. (6) Wiring connected between elements of the trap, especially those going out to the spring assembly, must be made resistant to a rodent's gnawing, tugging, or other destruction. The embodiment speaks of routing the wiring through grooves that are then covered. (7) The signaling mechanism can not easily be removed and reattached to another rodent trap when the one on which it resides becomes soiled or is otherwise no longer useable. (8) How is this trap to be stored? No mechanism is specified for preventing the signal from operating while the trap is being stored. As traps are stored in an uncocked position for reasons of safety, either the battery of this trap must be removed or a separate insulating means must be inserted between the spring contact and jaw member. In either of these cases the jaw member under the force of the drive springs, will still fully compress the spring contact against the base thereby in a short period of time reduce its operating free height and ability as a jaw member contact. (9) Once activated the audio signal buzzes constantly for a period of minutes or hours until the battery depletes. Continuous buzzing can constitute an obnoxious annoyance to nearby individuals whose only recourse is to immediately find and disable the trap signal. Additionally, if no one is near the trap for a period of hours after it is triggered, the condition of the trap will be unknown: the battery will have been depleted in that time period. Overall the use of an electrical DC buzzer, the large battery, the non-trivial assembly requirements, and the problems associated with the use of the spring contact make this trap signal overly large, costly and unreliable.

Brewer's U.S. Pat. No. 5,184,416 of Feb. 9, 1993 employs an external signaling device wired to a pair of contacts positioned to contact the jaw member and conduct through that jaw member between the contacts to form a switch. These connections with the jaw member take place on the outermost section of the jaw, the same section of the jaw intended to strike the rodent. Large drawbacks exist both in using an external signal source and in getting the rodent to cooperate so as to be trapped in a manner that allows both contacts to maintain continuity with the jaw member.

Orsano's Signaling Apparatus for Use with a Disposable Animal Trap, U.S. Pat. No. 5,477,635 of Dec. 26, 1995 employs a trap housing means containing the sense and signaling device. This patent employs a light and light receptor or an unspecified "equivalent mechanical means", that together sense movement of the jaw member as it passes through the area above where it is being retained by the jaw retaining member. Numerous disadvantages exist with commercializing this signaling apparatus: (1) A housing of dimensions substantially larger than the disposable trap to be used is required. (2) The disposable rodent trap must be retained in a fixed position relative to the sense mechanism within the signaling base. The attachment means of the preferred embodiment would not properly retain rodent traps whose dimensions varied from the one for which the signaling base apparatus was designed. Furthermore the sense mechanism relies on a physical relation between disposable trap and signaling base. Therefore a single unit design will not accommodate variously sized traps such as mouse and rat traps, and may not work properly with traps of differing manufacture. (3) The required sense mechanism must be made very sensitive as it must sense the thin wire jaw member as it moves rapidly through the sense region. (4) The audio signal is not in this case generated as based upon a steady state event as in previous designs, wherein a switch changed state and remained in that state. The signaling unit of this device records and latches an event when the sense mechanism detects an object in its field. This latched event is then what the output of the audio signal is based upon. (5) With reference to disadvantages 3 and 4 above; the sense mechanism may indeed sense the movement of the jaw member as described, yet it may identically sense a rodent crawling over that same area, or a fly, insect or other object that impinges or otherwise exists for more than few milliseconds above the retained jaw member. (6) Rodents may be wary of approaching a light beam as shown in the preferred embodiment. (7) A light source and sense mechanism draws power from its electrical power source at all times. The power source could be depleted without the trap even getting triggered, therefore periodic inspection would be needed to assure that the power source had not yet been depleted. (8) Finally the mechanism is large, complicated, and expensive to manufacture.

Possibly due in part to the inherent drawbacks, the above embodiments are not known commercially at the time of this application. Furthermore, at the time of this application no rodent trap signaling products are known to exist commercially that provide a suitably inexpensive means for signaling that a rodent trap, such as a mouse trap or rat trap, have been triggered.

OBJECTS AND ADVANTAGES

It is foremost an object of the present invention to provide an audio signaling device for use with rodent traps that overcomes the above listed limitations. The present invention further proceeds with additional objects and advantages. Specifically the objects of this invention are:

(a) to provide a low-cost audio signaling device for use with rodent traps;

(b) to provide a rodent trap signaling device that can be easily manufactured;

(c) to provide a signaling device that is simple and reliable: not prone to false triggering;

(d) to provide a signaling device whose position detection means, and whose overall design, is largely immune to high humidity, corrosion and environmental contamination;

(e) to provide a signaling device whose position detection means works properly regardless of the position, or the gyrations, of a rodent's body trapped under the jaw;

(f) to provide a signaling device that operates equally well for various sizes and designs of spring loaded rodent traps: including both mouse traps and rat traps;

(g) to provide a signaling device that can be easily removed from one disposable trap, that may be soiled or broken, and easily attached to another;

(h) to provide a signaling device that does not require a housing independent of the rodent trap;

(i) to provide an audio trap whose audio signal is not considered obnoxious to humans and does not require immediate user intervention;

(j) to provide a signaling device with a programmed series of alerting signal tones emitted at the time the rodent trap is triggered;

(k) to provide a signaling device with periodic audio beacon tones that facilitate finding the trap;

(l) to provide a signaling device with a periodic audio beacon that greatly conserves battery power;

(m) to provide a signaling device in which a small battery will power a trap that has been set and not yet triggered, for many months;

(n) to provide a signaling device powered by an inexpensive battery that is easily replaced;

(o) to provide an audio signal for a triggered trap that continues to signal trap condition for a period of time spanning a number of days;

(p) to provide a signaling device whose tunes and tones can be programmed by the manufacturer so that pleasant, easily distinguishable, and/or possibly humorous tone sequences or tunes may be created;

(q) to provide a signaling device whose presence and design reduces the probability of a rodent gnawing at the bait from the side of the trap for which the jaw mechanism is retained in the cocked position; thereby increasing the percentage of rodents trapped by the jaw mechanism upon triggering;

(r) to provide a battery powered signaling device that draws no current from the battery until the associated trap upon which it is attached has been triggered;

(s) to provide a battery powered signaling device that does not require an additional device or process to shut off the power being drained from the battery when the trap is in an unarmed position: examples would be power switches, removal of battery, and the use of any extra devices expressly to prevent current flow when the trap is not in use.

Still further objects and advantages may become apparent from a consideration of the ensuing description and drawings.

BRIEF DESCRIPTION OF DRAWINGS

FIG. 1-A is a perspective view of a rodent trap with signaling module.

FIG. 1-B is a side elevation view of a rodent trap with signaling module.

FIG. 5 is a numbered perspective view of an alternate embodiment

FIG. 6-A is a numbered side view of contacts in open position.

FIG. 6-B is a numbered side view of contacts in closed position.

FIG. 7-A is a schematic representation of the audio signaling module.

FIG. 7-B shows an internal block diagram of a microcontroller.

FIG. 8-A is the first page of firmware flowcharts and contains main loop.

FIG. 8-B is the second page of firmware flowcharts and contains subroutines.

REFERENCE NUMERALS USED IN DRAWINGS

Figure 2:
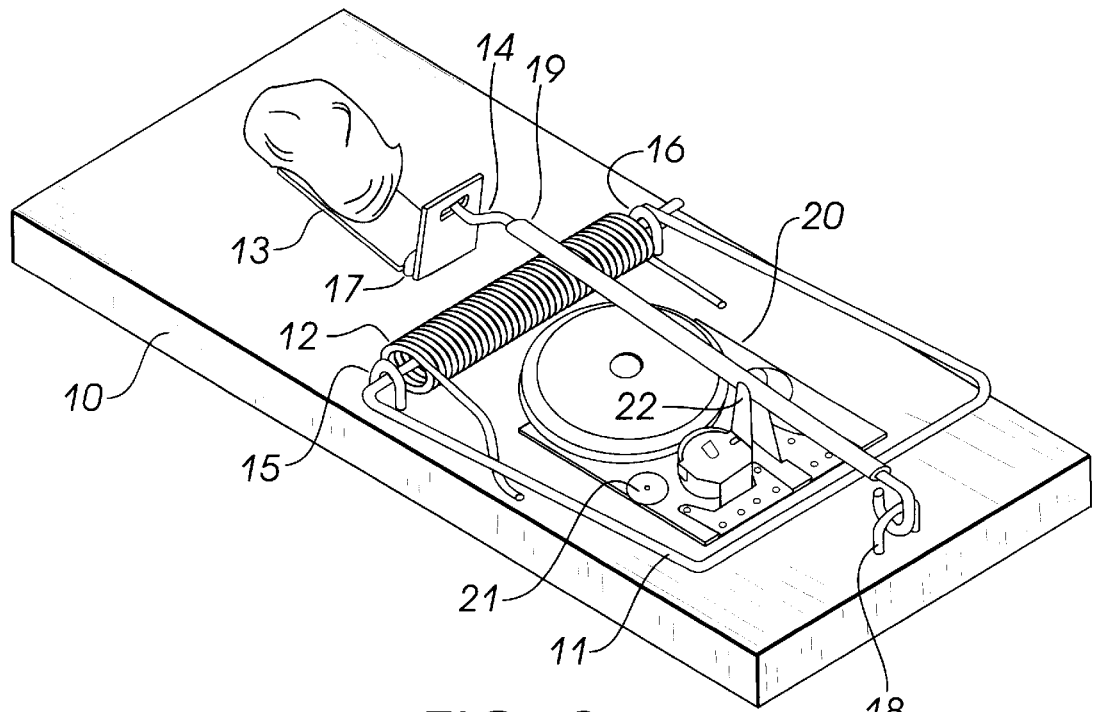
FIG. 2 is a numbered perspective view of a rodent trap with audio signal.
Figure 3:
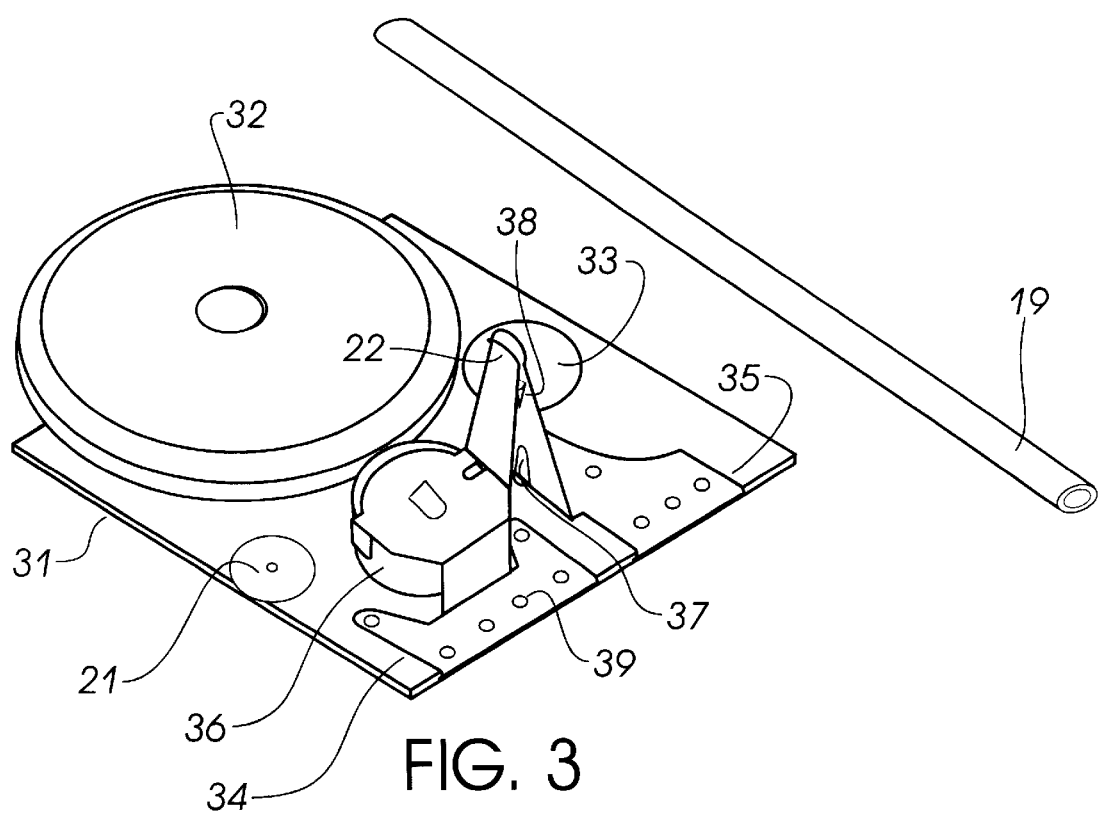
FIG. 3 depicts a perspective view of the audio signaling module.
Figure 4:
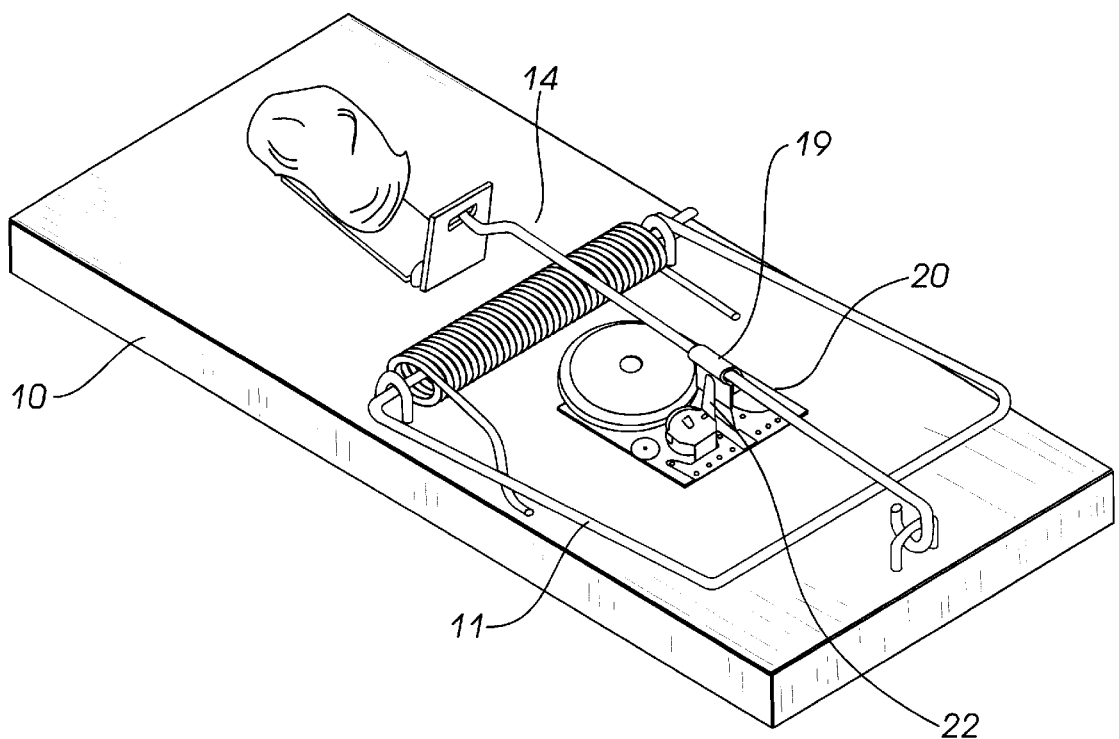
FIG. 4 shows the preferred embodiment mounted to a large rodent trap.

In FIG. 2, Trap with attached Audio Signaling Module:
10 Base of rodent trap
11 Jaw member
12 Coiled spring mechanism
13 Trigger with bait holder and bait
14 Jaw retaining bar
15, 16, 17, 18 Mounting staples
19 Jaw retaining bar insulator tube
20 Audio signaling module
21 Thumbtack module retainer
22 Electrical leaf contacts
In FIG. 3, Audio Signaling Module:
31 Printed circuit board
32 Piezo-electric audio transducer
33 Electronic control circuits
34 Battery mounting clip with contact
19 Jaw retaining bar insulator tube
35 Non-battery contact
36 3V Button cell lithium battery
37 Hole with positioning pin
38 Spiked contact points
39 Contact dots
In FIG. 4, Audio Signaling Module Mounted to Large Rodent Trap:
10 Trap base
11 Jaw member
14 Jaw retaining bar
19 Hanging jaw retainer insulator
20 Audio signaling module
22 Electrical leaf contacts
In FIG. 5, An Alternate Embodiment of Position Sense Means:
10 Trap base
11 Jaw member
14 Jaw retaining bar
20 Audio signaling module
22 Electrical leaf contacts
Jaw member insulator
In FIG. 6-A and 6-B, Contacts In Open and Closed Positions:
22 Electrical leaf contacts
25 Interposing member
26 Contact insulator
27 Contact spikes

SUMMARY OF THE INVENTION

A battery powered electronic signaling device for use on spring actuated rodent traps. The signal device mounts on top of the rodent trap and detects that the trap has been triggered and emits an audio signal followed by a periodic audio signal beacon.

DESCRIPTION OF THE PREFERRED EMBODIMENT

The audio signaling device of the preferred embodiment is an electronic module containing a microcontroller that can be mounted on a variety of spring loaded rodent traps. Describing the device requires a description of the mechanical parts, the mechanical parts of principle alternate embodiments, and the electronic parts. (Being of a process nature—the firmware is detailed under operation.)

Mechanical Description

Depicting the preferred embodiment of the audio signaling device mounted to a common style of small rodent trap is a perspective view of FIG. 1-A and a side view of FIG. 1-B. The specific rodent trap shown is of a size and style used for trapping mice. In the numbered perspective view of FIG. 2 the rodent trap contains a wooden base unit 10 to which is mounted a trapping means comprising a jaw member at 11 and a jaw retaining member at 14. The jaw member is alternately referred to as a bail assembly, a killing member, or a striking bar. The jaw member shown is formed into a substantially rectangular shape from a section of rigid wire. Nearest the center of the trap base is a section of the jaw member loosely fastened to the base unit whereupon the remainder of the jaw member pivots. Two "U-shaped" staples, 15 and 16 at each end of this pivoting section of wire retain it to the base. A coiled spring mechanism 12 surrounds this central pivot bar section of the jaw member with one end of the coiled spring pressed against the trap base and the other end under and in contact with a side section of the jaw member. The jaw member retaining bar of 14 has a bent loop at one end that hooks through a transversely mounted staple 18 thereby retaining that end of the bar, the other end being formed with a slight bend to allow proper engagement with a trigger mechanism when the trap is set in the cocked position, thereby making it ready to be triggered. A combination trigger assembly and bait holder is shown at 13 with a bait of rounded cheese ball attached. A wide "U-shaped" staple 17 retains the trigger assembly while providing its pivot point. The above description is consistent with a large variety of spring-loaded rodent traps, to which is attached the audio signaling device of this current invention.

The audio signaling device of this preferred embodiment is shown by 20 on FIG. 2, with a jaw retaining bar insulator 19 that is used on traps formed from conductive wire; such as the one shown. The insulator shown by 19 is fabricated from a section of thin semi-rigid plastic tubing that is slid over the wire of which the jaw retaining bar is made, thereby insulating it. The insulator of 19 could also be formed by coating a section of the jaw retaining member with an insulative coating or paint. A module containing the electronics, audio transducer, and position detection means is shown by 20. The module is attached by means of a tack 21 to the base of the trap 10. A set of vertical electrical leaf contacts 22 are held in separation by the jaw member retaining bar 14 and its insulator 19.

An enlarged view of the Audio Signaling device by itself is shown in FIG. 3. Note that this figure shows the vertical leaf contacts of the device 22 in a closed contact position (ON). The device comprises a printed circuit (PC) board 31 forming a small base for the audio signaling device that is mounted to the rodent trap, to which is mounted the piezo-electric audio transducer 32, the electronic control circuit 33, the combination battery holder with one contact leaf 34, and a second individual leaf contact is also shown 35. A hole with a positioning pin 37 is formed from a section of the contact 35 whereby a section is stamped, cut, and bent downward, opposite the leaf contact, and exits through a hole in the PC board extending 3/32 inch below it in a semicircular section. This projection is pressed into the trap base to align the audio module during assembly and to later prevent rotation of the module about the tack 21. Additionally a set of three curved contact spikes, one of which is partly visible, is formed on the contact surface 35 below the point of normal jaw retaining member insertion 38. The contact spikes are also shown 27 in the cross-section views of FIG. 6-A and FIG. 6-B. These spikes are stamped out from the contact section and are roughly triangular. These three contact spikes curve out and upward toward the top of the battery side contact. The sharp contact points at the end of each spike easily penetrate oxidation, corrosion or any filmy residues that may exist on the contact surfaces. Also the spikes prevent an interposing member, such as the jaw retaining bar, or the jaw member from being inserted too deeply in the contact pair. A button-cell lithium battery is shown 36 mounted in the battery holder formed by the other section of sheet metal 34.

The printed circuit board (PC board) 31 is composed of 0.32" fiberglass with 1/2 ounce copper, that has been etched; thereby leaving circuit traces which are then electroplated with nickel for corrosion resistance.

The electronic control circuit 33 in this preferred reduction to practice comprises a microcontroller chip as a small silicon "die" attached to the printed circuit board with epoxy and then wires are connected directly from the die to the traces of the printed circuit board and then the die and leads are covered with resin. The resultant resin dome containing the control electronics in this preferred embodiment is approximately 3/8 inch diameter, rising 1/16 inch high. This form of assembly is a common practice in the electronic toy industry.

A surface-mountable piezo-electric audio transducer 32 is soldered to the top of the printed circuit board. This piezo form of audio device requires a 2–5 kHz AC signal to drive it. The driving signal is more complicated than with DC buzzers or speakers; yet a piezo-electric transducer is low cost, small in size and has low current requirements.

A pair of electrical contacts is used within the preferred embodiment to sense when the trap has been sprung. A combination battery holder with one switch contact leaf 34 is formed from thin sheet metal; while the similarly formed mate for that contact leaf is also shown 35. The contact "leaves" and battery holder are stamped from two sections of thin corrosion resistant metal such as tinned spring-steel. After the metal sections are cut to shape, a "U-shaped" horizontal slot is formed to which the printed circuit board will later be inserted. A number of small dome shaped contact dots 39 are press-formed at intervals on the metal sections that will be in contact with the PC board to assure both electrical connection with the underlying printed circuit traces and mechanical retention when the PC board is inserted in the channel. One metal section forms the non-battery contact side 35 wherein a section of metal leading away from the channel lies on the surface of the PC board, then an 80 degree bend is formed at one end perpendicular to the mounting channel to form the non-battery side electrical leaf contact. Near the uppermost portion of this leaf contact are found three curved spike projections 38 which are again shown 27 in FIG. 6-A with contacts separated and in FIG. 6-B with contacts closed. These contact spikes assure corrosion resistant electrical contact while preventing the jaw retaining bar from being pressed or falling below the intended contact area of the leaf contacts. The other metal section 34 forms a battery holder and the battery side electrical leaf contact. This section is formed with metal leading away from the channel that is flush with the PC board surface for a distance of 80 mils, which is then bent to a vertical 90 degree bend parallel to the plane of the mounting channel that contacts the rearward vertical face of the cylindrical button-cell battery, it then bends 90 degrees back parallel to the PC board surface to enclose the top the battery, on one side of this top flat section another 90 degree bend goes vertical while being perpendicular to the mounting channel to form the other electrical leaf contact. Additionally the metal formed around the battery has extra downward facing vertical projections to contain the battery along the direction of the mounting channel.

The sides and top of the button-cell battery form the negative polarity contact while a small round contact on the bottom of the cell is in contact with a circular trace region on the PC board to make the positive polarity connection. The top section of both contacts bends back away from the contact zone to provide easy insertion of the insulated jaw retaining bar.

The preferred embodiment is again shown in FIG. 4 mounted to a larger rodent trap; of a type used for trapping rats.

Mechanical Description of Alternate Embodiment

To hold the contacts in an open position when the trap is set; a section of the jaw retaining member, the jaw member itself, or some protrusion attached to those members, is inserted, or interposed, between the contacts. The contacts thus far described must be rotated 90 degrees and made shorter if the jaw member is to be used for holding the contacts open. FIG. 5 shows a perspective view of this alternate embodiment: the jaw member 11 is mounted to a base 10 whose exterior contact interposing section 11 has been coated with an insulating coating 23, the combination of which keeps the contacts 22 of the audio signaling module 20 in electrical isolation. Notice that the jaw retaining member 14 is not directly involved with the audio signaling module in this embodiment. The preferred embodiment uses the jaw retaining member as the contact interposing member due to the following advantages: (1) The jaw retaining member can hold the contacts apart while the trap is not in use, and is therefore in an uncocked position. When the trap is uncocked the jaw member is on the trigger side of the trap and can not interpose between the contacts, so a separate means of either holding the contacts apart or switching off the current to the electronics would be necessary. (2) The jaw member has less freedom of movement and would require tighter tolerances when mounting the audio signaling module. (3) If trap members are formed from a conductive material, such as wire, then the jaw member retaining bar is easier to insulate than an enclosed bend of the jaw member. (4) The jaw retaining member is not involved in striking of the mouse and is thereby far less likely to obtain a coating of biological material that could foul the contacts or form a conductive layer.

Insulating sleeves are used in the preferred embodiment to insulate the contact interposing member; as the trap, to which the audio signaling device is attached, is considered to be constructed with rigid conductive wire that forms its trapping means. If the trap employs a trapping means formed from non-conductive material, then no such insulator is needed. Additionally alternative methods exist for preventing electrical conduction through a conductive trapping means; such as the jaw member or the jaw retaining member.

An example is shown in FIG. 4; a large rodent trap, such as may be used for trapping rats, is shown with the audio signaling device 20 fastened to the base of the trap 10. A small plastic insulating tag 19 hangs from the jaw retaining bar 14 and is used for holding the contacts 22 open when the trap is set in a cocked position. Note that since this trap is larger, the retaining bar sits higher off the base when the trap is in a cocked position and the tag style insulator bridges the gap so that the signaling module need not be mounted any higher and need not be built with a different set of contacts for this larger trap. A more direct method of insulation is shown by FIGS. 6-A where the contact leaves 22 are insulated from an interposing member 25 by a small molded plastic sleeve 26 which insulates a portion of one contact as well as the contact spikes 27. In FIG. 6-B the interposing member has been withdrawn, as if the trap had been sprung, and the spike contacts 27 of one contact leaf 22 is shown in contact with the other contact leaf 22 while the insulator 26 does not affect the electrical connection.

Electronic Hardware Description

A schematic, FIG. 7, shows the preferred electronic design of this audio signaling device. Minimized part count is achieved in the preferred embodiment by selecting a primary circuit device capable of programmed output sequencing that integrates a number of functions at low cost.

An 8-bit microcontroller from Microchip, PIC 12C509 is used herein. A microcontroller is a simple form of digital computer containing program store, data memory, digital input/output (I/O), and other functions in one integrated circuit (IC) package. The PIC 12C509 microprocessor employed in this preferred embodiment contains: program memory, data memory, an on-board oscillator, reset circuitry, port pins that can be set for either input or output, selectable pull-up resistors on inputs, internal sleep circuitry, a wake-up timing circuit, and a general purpose timing element.

Providing power to the microcontroller is a 3 Volt lithium battery cell through a switch formed by the vertical leaf contacts described earlier.

A piezo-electric audio transducer is driven by two of the microprocessor's general input/output (I/O) port pins. Piezo-electric transducers operate on principles similar to quartz frequency crystals and require AC excitation that in this case is provided by programmed push-pull voltages on the microcontroller. The frequency response of a piezo device is limited in range and linearity, containing huge spikes at resonant frequencies, yet for simple tone outputs a high decibel level is produced at low current consumption.

Option jumpers are read in using another two I/O pins of the microcontroller. Option jumpers allow the manufacturer to select one or more operating features for the device. In the current embodiment these option bits select one of four tunes to be played when power is applied to the circuit. These jumpers are implemented on the printed circuit board as thin curved traces between two circuit pads. Actual pin-based jumpers could be employed, allowing easy user selection, but are unnecessary in this embodiment. The jumpers are registered by the microcontroller as low-voltage, or logic level 0, as they are connected with processor ground. Once a jumper trace is cut, the associated pin of the microcontroller floats up within 500 mV of the battery voltage and thereby will be registered by the microcontroller as a high voltage, or logic level 1.

OPERATION OF THE PREFERRED EMBODIMENT

Understanding the operation of this audio signaling device for rodent traps requires understanding the mechanical operation, the mechanical operation of alternate embodiments, the electrical operation, and finally the operation of the underlying firmware.

Mechanical Operation

In reference to FIG. 2, the audio signaling device 20 is located opposite the trigger means; and being both uneven and slippery dissuades the rodent from approaching the bait from this non-trigger side, from which the probability of trapping the rodent is reduced. As a rodent interacts with the bait or artificial attractant, it moves the trigger 13 which frees the trapping means starting with one end of the jaw retaining bar 14. The jaw 11 being under tension by the coiled spring 12, now no longer retained by the retaining bar 14, accelerates rapidly away from the trap base 10, pivoting around the section retained by the staples 15,16. As the jaw accelerates; the vertical component of movement displaces an end of the retaining bar previously held by the trigger 13, up and away from the base unit. One end of the retaining bar rises vertically; while the other end is retained by the staple 18. As the insulater 19 and jaw retaining bar 14 are thus angularly displaced from the base unit; the interposing section previously held between the leaf contacts 22 of the audio module are displaced, allowing those contacts to establish electrical connection. As the metal leaf contacts 22 connect, electricity flows to the electronics.

Mechanical Operation of Alternate Embodiment

The alternate embodiment of FIG. 5 operates in like manner upon being triggered; wherein contact is established when the jaw member 11 with its insulating coating 23, being no longer retained by the jaw retaining member 14 move up away from trap base toward unsuspecting rodent gnawing on the bait.

Electrical Operation

When the trap is triggered, electricity flows from the battery through a set of closed switch contacts to the microcontroller. The controller performs an internal reset operation and then starts execution of program instructions contained in firmware. Firmware directs the various actions under the microcontrollers' control.

Audio is generated by the microcontroller as it alternately sets each side of the piezo-electric transducer from hi-voltage to low-voltage in closely-timed sequences, for example to produce a basic 2 kHz tone: each side of the transducer must transition, either from low to high, or high to low, every 250 microseconds (uS).

A block diagram of the internals of the PIC 12C509 microcontroller is shown in FIG. 7-B as an aid to understanding the overall system operation. Although features and structures of Microchips' PIC 12C509 are discussed, it is not to be inferred that the design requires this given microcontroller. A number of available microcontrollers can be substituted with minor circuit and/or firmware alterations.

As can be seen from the internal function block diagram in FIG. 7-B, the "microcontroller" has a microprocessor core that contains numerous function blocks: Data paths are indicated in the figure by pairs of lines terminated by arrows. An "ALU" (Arithmetic and Logic Unit) performs bit-wise addition, subtraction, and logic operations. A "W" register for receiving the ALU output or as ALU input. A multiplex input "MUX" to the ALU allows selection of ALU input terms. A "status" register holds ALU operation flags such as overflow "OVF" or carry, A "Data Memory" store in random access memory "RAM" holds program variables. An address multiplexor "Address MUX" selects either direct addressing or relative addressing via the file select register "FSR" register. A "Program Memory" area contains the programmed instructions. A "Program Counter" register selects addresses within the program memory whose program data is loaded into an "Instruction Register". Portions of the contents of the instruction register are fed to both the "Instruction Decode and Control" register for interpreting the instruction, and the "address MUX" which addresses locations in the data memory. A two register program counter stack of "STACK1" and "STACK2" allows saving program counter values for use with calling and returning from subroutines.

In addition to these microprocessor functions, this microcontroller contains: "General Purpose INPUT/OUTPUT" registers that read digital inputs and set digital outputs. A "WatchDog Timer" circuit interrupts errant program operation and wakes the processor from sleep mode. A "Reset Timer" controls holding the processor in reset while the oscillator circuit stabilizes A "Power-On Reset" circuitry controls resetting of the processor when power is applied or restored. "Timer 0" is a multipurpose timing element under program control, it keeps track of time intervals independently of programmed timing loops. An "Internal Oscillator" provides a clock signal for the microcontroller so that external timebase elements are not required. Same or similar functions to these are provided by numerous other microcontrollers on the market.

Firmware Operation

As rodent interacts with bait, the trap is triggered thereupon the microcontroller receives power and begins program execution from its reset vector. The flowcharts of FIG. 8-A and FIG. 8-B detail the functional flow of the firmware code processed by the microcontroller.

The microcontroller comes out of "POWER-ON RESET" and begins program execution as shown by block "a" in FIG. 8-A. In "b" the hardware is initialized to a known state whereby audio is turned off, a timebase is set, and the extra input/output lines are set as inputs. In "c" the internal memory registers are initialized to a known state. Two of the input lines are used for allowing the manufacturer to select which of four tunes are used for the audio signal, these bits are read in and saved in block "d". The tune selection being made, pointers to the proper table are loaded in block "e". In "f" the software delays for a few hundred milliseconds to assure real contact was made and not a capacitive charge buildup, or intermittent pulse. Low-level control registers are set for the tune sequence in block "g", these control the varying tone sequencing within a tune. Finally the subroutine "Ptune" is called at "h" (flowchart in FIG. 8-B) which plays the selected initial tune sequence. This tune sequence plays for 4–8 seconds. The audio signal device has now alerted anyone nearby that the trap has been sprung. Now it enters audio beacon mode whereby a short simple tone sequence of approximately 1 second duration is played every 7 minutes.

To conserve battery power while in beacon mode, the software puts the microcontroller to sleep by setting an internal timer called a "watchdog timer", this is initialized at "i" along with turning off the audio output. In sleep mode "j", the processor draws less than 1 microampere and wakes every 2 seconds. The processor awakes at "k" and increments a counter called "LSleep", at "1". Register "LSleep" is tested at block "m". If "LSleep" overflows upon increment, then 7 minutes have elapsed since the previous audio beacon and execution thereby continues to "n". If the register hasn't overflowed, then execution returns to block "i" where the watchdog gets set to be put back to sleep. At "n" the parameters are prepared for playing of the audio beacon, which is played by calling "PTune" at block "p" (FIG. 8-B). Once the beacon has played, execution returns and branches to "i" where the processor is prepped again for sleep. This beacon sequence repeats until the trap is located and the jaw retaining bar is slid back between the contacts, with or without cocking of the spring loaded jaw.

Referring to FIG. 8-B, subroutine "PTune" is entered at "a1" it proceeds to perform a table look up of the tone parameters for the first tone sequence at "b1". Subroutine "PTone" is called at "c1" to play a particular type of tone at the specified frequency for the specified duration. On return the table lookup pointers are advanced at "d1" and a check is made to determine if the end of the tone table has been reached at block "e1". If tone parameters remain then execution jumps back to block "b1" where it loops through playing the next tone in the sequence. It should be noted that a silence interval is one of the types of tones. If tone sequences are finished, then a return is made at "f1" to the main program. This means of stringing tones of various frequencies and structure together to create a tune allows the creation of long tunes with significantly less memory than is required with a full ROM lookup of each output transition.

Again referring to FIG. 8-B, subroutine "PTone" is entered at "h1" and proceeds at "j1" to turn on the output pins driving the audio (changed from inputs to outputs). Counters are initialized at "k1" and then "TType" parameter, which specifies the waveform type of the tone, is used as an index to a jump table at "m1". A jump is made to one of several tone type routines. The one shown starting with "p1" is a square wave, whereas the other sequences noted at "n1" provide silence, and tones with differing duty cycles. The alternate tones, though not shown, follow the same basic flow. Within block "p1" the value of "TFreq" is modified to suit the tone in use. At "r1" the "TDuration" parameter is converted to a loop count value. Then in the section of blocks designated as "s1" the output pins connected to the piezo-electric audio transducer are alternately set to Hi and Low voltage as a push-pull driver to the audio transducer. Moving to "t1" a loop counter is decremented and tested at "u1"; if the tone has played for the desired time then a return at "w1" is made, otherwise control branches back to the start of the group of blocks at "s1" and continues toggling the output pins thereby producing sound.

SUMMARY RAMIFICATIONS AND SCOPE

The preferred embodiment details a combination of microcontroller and firmware plus 5 other elements that provide a self-contained audio device that signals when a rodent trap has been triggered. This signaling device contains an audio beacon for long-term signaling and trap location and can be programmed for unique audio signal tunes, while being low cost, reliable, immune to rodent damage, and easily manufactured. Additionally the audio signaling device is reusable and fits traps of various sizes and manufacturers.

An example of a small spring loaded rodent trap was used in the previous descriptions and drawings, excepting the large trap of FIG. 4. Such spring-loaded rodent traps vary widely and are often designed with dual springs, a separate jaw members pivot section, and trigger mechanisms of every sort: such as one trap that employs a combination bait, bait holder, and trigger mechanism all formed from a single section of yellow molded plastic that has the color, look, and scent of cheese. There are numerous designs of spring loaded rodent traps that employ a jaw and jaw retaining member, yet the design of the audio signaling device of the current invention allows it to function with any of these various designs and sizes of rodent traps.

A number of nearly equivalent variations of this audio signaling module can be arrived at quickly without the faculty of inventive creation, a few have already been described, numerous other variations are quickly arrived at.

A pair of electrical contacts are used in the preferred embodiment for sensing the position of the jaw retaining member, or alternately the jaw itself, as they are simple, inexpensive, and can be used as a power switch so that no power is consumed unless the trap has been triggered. Each contact half could be further subdivided into separate contact areas and thus the contacts would be referred to as a contact set instead of a pair, but the overall function would remain identical. An inferior detection means can be created using manufactured switches substituting for the metal contacts; wherein the trapping means holds the contact in one state and transitions to the alternate state upon triggering. Using smaller switches, the printed circuit could contain a snap button switch, or capacitive switch that is triggered by an element attached to one of the trapping means. Alternately other position sensing means exist whereby contacts could be used as a pure sense element, or a non-conductive sensor such as an inductive pickup coil, hall effect sensor, capacitive sensor, or optical interrupter could be used to sense when the trapping means, specifically the jaw or jaw retaining member, leaves its cocked position. Each of these alternates is more costly and requires the electronics to be on and reading the sensor thereby incurring a power draw from the battery source prior to the trap being triggered. A sensor could even be used that detects movement of the jaw in mid-swing—yet as discussed in prior art this method is unreliable and unnecessarily costly. The use of a processor, such as the PIC 12C509, chosen with a low current consumption sleep mode allows many of these methods to be implemented at a more reasonable level of power consumption, yet the chosen contact method is still simpler, less expensive and more reliable.

Although a microcontroller chip die, PIC 12C509, comprises the electronic control circuitry of the preferred embodiment, numerous other circuits and assembly means exist. The microcontroller circuit could be substituted with various other makes of microcontrollers, a custom control circuit, a semi-custom circuit, a programmable logic circuit, discrete circuits of functional equivalence, or a mixture of circuit types. The method of assembly used, whereby a die is bonded to the printed circuit board could be substituted with other means of circuit packaging and mounting such as through hole, surface mount, ball grid array, or new packaging/mounting mechanisms with similar result.

Additional electronic capabilities can be easily added to the device: By just adding a set contact traces to the PC board, the microcontroller of the preferred embodiment can be programmed after assembly so that units may be produced in quantity for various manufacturers and then programmed for any particular manufacturer or application just prior to shipment. An optical signal means can be added to the device easily, by connecting an LED from battery supply to an unused I/O pin of the controller or any number of other ways. An optical signal, such as this, generally consumes more power than its little value as an added indicator warrants. Minor enhancements such as these are easy to add but of little value over the preferred embodiment.

The piezo-electric transducer of the preferred embodiment requires more complicated drive signals than a device such as a DC buzzer, yet it provides a true variable tone ability while being low cost and low power. A speaker, employing a cone and coil arrangement, could be substituted though a loss in battery life would result. New forms of audio transducers may emerge that may be an improvement to the piezo-electric transducer, these could then be substituted. The audio transducer used may be mounted directly via surface mount, or with through hole mounting, on wire leads, or using an alternative means.

A button-cell lithium battery is used in the described embodiment whereas a number of power alternatives exist employing various number of cells and cell chemistries, such as using a pair of button cell alkaline cells or similar that have a rating of 1.5 Volts each, or using a pair of lithium batteries to get the voltage up to 6 Volts to more easily generate a high audio decibel level. Both contact halves could easily be built as combination battery holders/contact should multiple battery cells be used.

Numerous mechanical designs will facilitate creation of a set of contacts and a button cell battery holder, the preferred embodiment is but one example. The battery holder and leaf contacts can be formed from various materials, such as copper, they may be created individually, and they may be fastened using the described "U-channel" mechanism or they may be riveted, soldered, or fastened by other means to the printed circuit board.

The printed circuit board of the described embodiment is constructed from fiberglass material, alternately phenolic printed circuit board material could be used and is less expensive for very large production runs of the PC Board. Additionally plastic or a fiberboard material with a printed-on conductive coating for the traces can be cost effective for these very large production runs. A two-sided or multi-layer PC board could be used at greater expense.

Aside from a tack, numerous other methods exist for attachment of the electronics to the rodent trap such as glue, screws, staples, existing trap fasteners or staples, or a mating style fastening system of which one example is a hook-and-loop fastener.

The electronics of the preferred embodiment are mounted on a single printed circuit board to form a module which facilitates mounting and eliminates the need for wired connection; yet many equivalent variations exist. Any of the electronic elements can be mounted separately to the trap or in combination and then mounted to the trap. The piezo transducer could be attached separately from the rest of the electronics, as could the position detector or battery. Elements can be combined, for example mounting all electronics of this device on the piezo-electric transducer and it would function as the printed circuit board, or just combining the piezo-electric transducer with the electronics. Also these parts could be fastened to a part of the trap besides the base, they could be attached to the spring mechanism by use of a clip assembly, or other parts of the trap.

Other variations could be created by eliminating or altering capabilities such as the audio signaling beacon and the option jumpers. The jumpers could be brought out to physical jumpers acting as switches that allow user selection of device parameters such as tunes and timing.

Upon reviewing the invention thus described in the preferred embodiment, additional variations will become obvious to those skilled in the art and without the exercise of inventive faculty. Accordingly the scope of this invention is defined by the scope of the following claims.

What is claimed:

1. A rodent trap with an audio signaling device, comprising:
   (a) a base member;
   (b) a trapping mechanism mounted to said base member, said trapping mechanism comprising:
      (i) a jaw member;
      (ii) at least one biasing member to provide a torsional force on said jaw member;
      (iii) a jaw retaining member to hold said jaw member under said torsional force in a cocked position; and
      (iv) a trigger member connected to said jaw retaining member wherein upon being triggered by the application of a triggering force to said trigger member, said trigger member releases said jaw retaining member such that said jaw member is driven by torsional force from its cocked position to trap a rodent;
   (c) said audio signaling device mounted to top of said base, comprising:
      (i) a switch mechanism having at least two electrical contacts configured to move in response to said trapping mechanism having left said cocked position at which time a change in conductive state of said switch mechanism takes place, wherein the current being switched by said switch mechanism is not conducted through said jaw member; wherein said switch mechanism do not come in contact with said jaw member when said trapping mechanism has left said cocked position;
      (ii) a power source for providing power to said audio signaling device;
      (iii) an electronic audio source which produces sound when said switch detects that said jaw member has left said cocked position.

2. A rodent trap as recited in claim 1, wherein said audio signaling device is attached generally opposite the trigger member.

3. A rodent trap as recited in claim 1, further comprising an interposing member attached to said trapping mechanism configured to interact with said switch mechanism during operation of said trap, wherein the trapping mechanism and said structure are subject to movement detectable by said switch mechanism.

4. A rodent trap as recited in claim 3, further comprising an insertion depth limiting structure incorporated within at least one of said contacts, said insertion depth limiting structure limits the depth to which a first member inserted between the contact halves can move while still retaining said first member in a region between said contact halves such that said contact halves are held in separation from one another.

5. A rodent trap as recited in claim 1, wherein said electrical contacts of said switch mechanism are held in an open non-conductive state by interposing a section of said trapping mechanism, such that upon said trap being triggered, movement of said trapping mechanism from the cocked position results in movement of said section of the trapping mechanism from between said electrical contacts wherein an electrical connection is established between said electrical contacts.

6. A rodent trap as recited in claim 1, wherein said electrical contacts are held in an open non-conductive state by an interposing member attached to said trapping mechanism, such that upon said trap being triggered, movement of said trapping mechanism from the cocked position results in movement of said interposing member from between said electrical contacts wherein an electrical connection is established between said electrical contacts.

7. A rodent trap as recited in claim 6, wherein said interposing member comprises a non-conductive structure attached to said jaw retaining member which provides electrical isolation between said electrical contacts when inserted therebetween when said trap is cocked.

8. A rodent trap as recited in claim 1, wherein said electronic audio source is comprised of:
   (a) an electronic circuit for generating timed sequences of electrical signals, wherein the electrical signals generated can be converted to sound patterns which are selected from at least one of a group consisting of audio tones, tones with silence intervals, speech and music; and
   (b) an audio conversion device for converting said electrical signals into audio signals, wherein said audio conversion device comprises an acoustic transducer selected from at least one of a group consisting of a piezoelectric transducer and a speaker.

9. A rodent trap as recited in claim 8, wherein said electronic circuit for generating timed sequences of electrical signals includes a sleep state which may be entered by said electronic circuit to conserve audio signaling device power, wherein the electronic circuit performs a reduced set of operations at a reduced level of power consumption, in which no audio signals are generated, during said sleep state, whereby the audio signaling device can continue to generate intermittent sound for extended periods of time when the electronic circuit is not in the sleep state to aid a user in locating said rodent trap that has been triggered.

10. A rodent trap as recited in claim 8, wherein said electronic circuit further comprises at least one electrical input for reading a logic state from at least one option jumper, whereby the states of option jumpers configure the electronic circuit for generating said timed sequences of electrical signals so that sound outputs may be responsive to jumper settings.

11. A rodent trap as recited in claim 8, wherein said electronic circuit comprises at least one electronic device selected from at least one of a group of electronic devices consisting of microcontrollers, programmable logic devices, custom integrated circuits, audio oscillators, and operational amplifiers.

12. A rodent trap as recited in claim 8, wherein said electronic circuit comprises a microcontroller.

13. A rodent trap as recited in claim 1, wherein said electronic audio source draws power from the power source via the switch mechanism when said switch mechanism is in said conductive state.

14. A rodent trap as recited in claim 1, wherein said power source comprises at least one battery cell.

15. A rodent trap as recited in claim 1, further comprising a circuit board electrically connecting said power source, said switch mechanism, and said electronic audio source.

16. A rodent trap as recited in claim 1, wherein said audio signaling device is mounted to the base of the trap with at least one mounting means selected from at least one of a group of mounting means consisting of adhesives and fasteners.

17. A method of providing an audio signal when a spring-loaded rodent trap has been triggered, wherein said rodent trap comprises a base member upon which is mounted a trapping mechanism which includes, a jaw member, a jaw member retainer, a trigger member, at least one spring member to provide a torsional spring force to said jaw member, and an audio signaling device, wherein the method comprises the steps of:

(a) fastening said audio signaling device to said base of said trap generally opposite the mounting location of said trigger member;

(b) holding electrical contacts of said audio signaling device in an open non-conducting state by interposing a portion of said trapping mechanism between contact leaves of said contacts when said trapping mechanism is in said cocked state;

(c) generating audio sound or audio tones when said audio signaling device receives an electrical signal from said contacts when said trap leaves said cocked position as sensed by the electrical contacts.

18. The method of claim 17, wherein said step of generating audio sound further comprises the step of repeatedly generating a sound pattern, wherein said pattern includes alternating a sequence of short audio tones with a silence period.

19. An audio signaling device for attachment to a rodent trap; said rodent trap comprising a base on which is mounted a spring loaded jaw member, jaw retaining member, trigger member, and to which on said base is attached said audio signaling device which comprises:

(a) electrical contacts of a switch mechanism which is configured to detect movement of the trapping mechanism when said trapping mechanism leaves said cocked position, wherein said electrical contacts do not comprise any portion of said jaw member; wherein said switch mechanism do not come in contact with said jaw member when said trapping mechanism has left said cocked position;

(b) a power source for providing power to said audio signaling device;

(c) an electronic circuit capable of generating timed sequences of electrical signals in response to said electrical contacts detecting when said trapping mechanism leaves said cocked position; and (d) an audio conversion device for converting said electronic signals into audio signals for the production of sound and audio tones.

20. The trap of claim 19, wherein said electronic circuit capable of generating timed sequences of electrical signals includes a sleep state which may be entered by said electronic circuit to conserve audio signaling device power, wherein the electronic circuit performs a reduced set of operations at a reduced level of power consumption, in which no audio signals are generated, during said sleep state, whereby the audio signaling device can continue to generate intermittent sound for extended periods of time when the electronic circuit is not in the sleep state to thereby aid a user in locating said rodent trap that has been triggered.

* * * * *